July 15, 1941. R. W. ATKINSON Re. 21,853

METHOD AND APPARATUS FOR MEASURING ECCENTRICITY IN TUBULAR CONDUCTORS

Original Filed March 10, 1934 3 Sheets-Sheet 1

INVENTOR
RALPH W. ATKINSON
BY
Emery, Booth, Varney & Whittemore
ATTORNEYS

METHOD AND APPARATUS FOR MEASURING ECCENTRICITY IN TUBULAR CONDUCTORS

Original Filed March 10, 1934 3 Sheets-Sheet 2

INVENTOR
RALPH W. ATKINSON
BY
Emery, Booth, Varney & Whittemore
ATTORNEYS

METHOD AND APPARATUS FOR MEASURING ECCENTRICITY IN TUBULAR CONDUCTORS

Original Filed March 10, 1934 3 Sheets-Sheet 3

INVENTOR
RALPH W. ATKINSON.
BY
Emery, Booth, Varney & Whittemore
ATTORNEYS

Reissued July 15, 1941 Re. 21,853

UNITED STATES PATENT OFFICE 21,853

METHOD AND APPARATUS FOR MEASURING ECCENTRICITY IN TUBULAR CONDUCTORS

Ralph W. Atkinson, Westfield, N. J., assignor to General Cable Corporation, New York, N. Y., a corporation of New Jersey Original No. 2,200,827, dated May 14, 1940, Serial No. 715,036, March 10, 1934. Application for reissue May 10, 1941, Serial No. 392,988

36 Claims. (Cl. 175—183)

This invention relates to a method and apparatus for measuring variation in the thickness of tubular electrical conductors. More particularly, the invention is concerned with measuring and recording the eccentricity of a tubular conductor such as the metal sheath enclosing one or more insulated conductors. It is an object of the invention to provide an improved method and apparatus for measuring and recording variation in the thickness of tubular conductors. Other objects and advantages of the invention will appear hereinafter.

The invention will be best understood from the following description when read in the light of the accompanying drawings illustrating certain specific embodiments of the invention.

Figure 1:
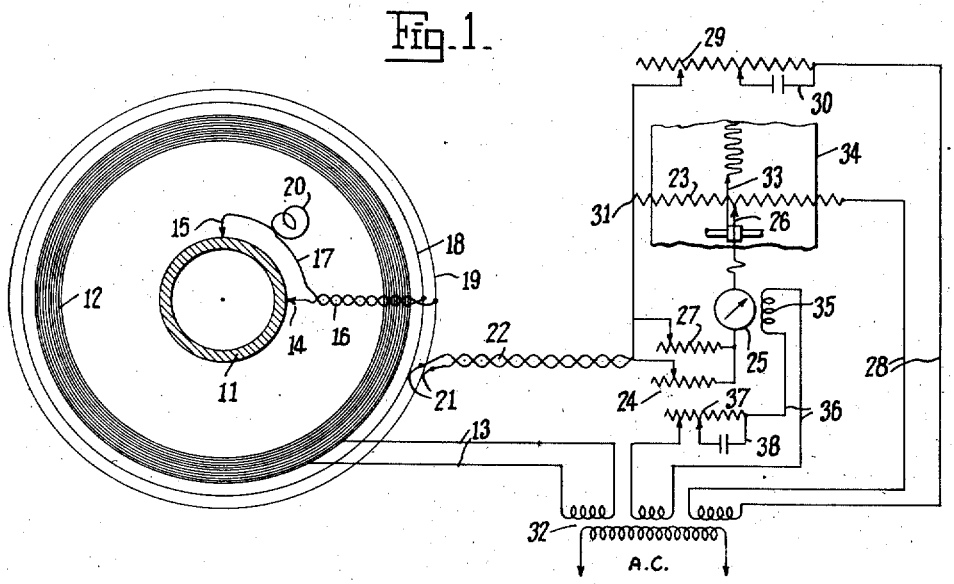
Figure 1 is a diagrammatic representation of one embodiment of the invention.

In metal sheathed cables the sheath usually is in the form of a continuous lead tube extruded about the insulated conductor or conductors. Desirably, the sheath thickness is uniform both circumferentially and longitudinally of the cable. Due to the variations in temperature the volume of the insulating compound with which the cable is filled changes from time to time. On account of the incompressible nature of the compound, the effect of the sheath in restraining the expansion with increased temperature is negligible, and consequently the sheath must expand to accommodate the increase in volume.

If the sheath wall is of uniform thickness circumferentially, this expansion is accomplished by a small, approximately uniform percentage of stretch around the complete circumference. If, however, the sheath is eccentric, the greater part of the stretch will occur at the thinnest part of the circumference and the percentage stretch of this portion will be much more than when the elongation is distributed in the case of a uniform sheath. Where conditions are such that oil flows longitudinally along the cable after the cable has cooled, refilling the expanded sheath, a new expansion and stretching will occur in the case of a new heating. Then with successive expansions, this effect will tend to be cumulative and may ultimately result in rupture of the thin section. With a concentric sheath, the total stretch being distributed uniformly around the circumference results in greatly reducing the maximum amount of stretch in any one section and the danger of sheath failure from this cause.

Furthermore, if the thickness of the cable sheath can be accurately controlled and kept uniform within narrow limits it may be possible in some cases to use somewhat thinner sheaths with the same degree of safety now attained.

Not only is it important to know whether or not a cable sheath is eccentric, but the actual amount of eccentricity should be accurately known, and desirably the location of the eccentricity longitudinally of the cable should be known. The importance of these measurements will be apparent when it is realized that even though the extruding die be accurately adjusted at the beginning of the sheathing operation to give a concentric sheath, this adjustment may vary as the sheathing operation proceeds. Heretofore, no means have been available to continuously measure the thickness of the cable sheath as the sheath is applied. Desirably any variation in the thickness of the sheath wall circumferentially of the sheath is measured as the cable comes from the extruding machine. If this measurement provides a continuous indication or record of any eccentricity in the cable sheath it is a relatively simple matter to make the necessary adjustment of the extruding die in well known manner to restore the sheath to uniform circumferential thickness. For this purpose it is desirable not merely to know when the eccentricity of the sheath exceeds a certain predetermined amount, but it is important to have a continuous measurement of the actual amount of eccentricity.

According to the present invention a method and apparatus are provided for continuously recording variation in the thickness of a tubular conductor circumferentially of the conductor, whereby eccentricity not only is indicated, but the actual variation in thickness of the sheath wall is continuously recorded. While the invention is described with particular reference to the measurement of cable sheaths, it will be obvious that the invention is applicable to the measurement of other tubular conductors.

Figure 1 illustrates diagrammatically one particular apparatus for measuring the thickness of a tubular conductor and for making a permanent record of any variation in the thickness of the conductor. Means are provided for establishing a flow of current circumferentially in the tubular conductor 11, and conveniently this means comprises a coil 12 through which the conductor moves co-axially. The coil 12 is connected, as by means of the leads 13, to a source of alternating current. Flow of current through the coil 12 sets up a magnetic field surrounding the coil which induces a current flow circumferentially in the tubular conductor 11.

Two contacts 14 and 15, desirably mounted within the coil 12 substantially midway of its length, engage the conductor 11 at circumferentially spaced points lying in a plane perpendicular to the longitudinal axis of the conductor. In the illustrative embodiment of Figure 1 the contacts 14 and 15 are spaced apart at an angle of 90 degrees.

If the sheath is uniform in thickness circumferentially and centrally located in the coil 12, the voltage drop in any portion of a circumferential path in the sheath due to the current flowing in the sheath will be exactly equal to the voltage generated in that portion of the path by the flux set up by the current in coil 12, and no potential difference will exist between contacts 14 and 15. If the thickness of any portion of the path is different from the average thickness for the whole circumference, the resistance drop in this part per unit length will be correspondingly different from that of the average for circumference. The voltage set up per unit length by the flux within the sheath will, however, remain the same so that the generated voltage and the resistance drop will no longer be equal, and a difference in potential will now appear. This difference in potential is proportional to the deviation of the sheath thickness between the contacts from the average thickness.

If the conductor is rotated relative to the contacts, any variation in the sheath thickness between the contacts will be accompanied by a change in the resistance, and therefore of the voltage between the contacts. An alternating current galvanometer or other suitable measuring device may be connected to the contacts in the manner hereinafter set forth to indicate any variation in the potential between the contacts, and therefore any variation in the conductor thickness.

Where a single pair of contacts are used it is necessary to move the contacts relative to the conductor in a circumferential as well as longitudinal direction in order to obtain a measurement of the conductor eccentricity. Conveniently the conductor moves longitudinally under the contacts as the contacts are rotated about the conductor. Since changes in eccentricity in a cable sheath ordinarily are gradual longitudinally of the cable, the rotation of the contacts may be relatively slow.

Extending from the contacts 14 and 15, respectively, are the electrical leads 16 and 17, preferably twisted together, which connect with the slip rings 18 and 19. The slip rings 18 and 19 turn about the conductor 11 with the contacts 14 and 15. The leads 16 and 17 lie in the magnetic field surrounding the coil 12, and consequently a voltage will be induced directly in these leads in addition to the resistance drop in the tubular conductor between the contacts 14 and 15. As will be more fully described hereinafter, means desirably are provided to neutralize or compensate for any voltage in the external circuit connected with the contacts 14 and 15 other than the resistance drop in the tubular conductor. Conveniently, such means introduces into the circuit a voltage 180 degrees out of phase with the induced voltage. As shown in Figure 1, a compensating coil 20 located adjacent to the tubular conductor and within the magnetic field surrounding it, is connected in the head 17, and this coil may be adjusted to compensate for the voltage other than that existing in the tubular conductor between the contacts 14 and 15.

Engaging the slip rings 18 and 19 are brushes 21 connected by means of the conductors 22, preferably twisted together, to a suitable measuring instrument. If it is desired to merely have a visual indication of variation in conductor thickness, the leads 22 may be connected directly to a galvanometer. In that case, any variation circumferentially in the thickness of the tubular conductor as it moves under the rotating contacts 14 and 15 will result in a change of galvanometer reading which is proportional to the variation in thickness in the conductor. Therefore, it is possible to calibrate the galvanometer scale to indicate directly the actual variation in sheath thickness.

Where voltage in the tubular conductor between the contacts 14 and 15 is referred to, this means the root mean square value of the alternating voltage having the same frequency as that of the exciting coil 12. It is the variation in the root mean square voltage during a revolution of the brushes around the tubular conductor, and not the change in instantaneous values during a cycle of the impressed voltage which gives a measure of variation in the conductor thickness.

Ordinarily, it will be desirable to make a permanent record of variation in the thickness of a cable sheath, and conveniently this may be done by connecting to the leads 22 a graphic millivoltmeter. The term "graphic millivoltmeter" is used herein to denote broadly any means for measuring and recording low voltages. Figure 1 shows diagrammatically such an instrument for making a permanent record of variation in the conductor thickness. This instrument is of the slide wire type wherein the voltage drop between the contacts 14 and 15 is balanced with a voltage in the slide wire 180 degrees out of phase.

Any change in the resistance drop in the tubular conductor between the contacts 14 and 15 destroys this balanced relation. Thereupon means are automatically brought into operation to vary the point of contact on the slide wire and restore the voltage balance. This last mentioned means conveniently has associated therewith means for making a permanent record of the variation in the balancing voltage, corresponding to the point at which contact is made on the slide wire, and since this variation will be proportional to the variation in thickness of the tubular conductor, the record so made is an accurate representation of the conductor eccentricity.

Referring again to Figure 1, one of the leads 22 is connected to one end 31 of the slide wire resistance 23. The other lead 22 is connected through a variable resistance 24 and a galvanometer 25 to a contact 26 engaging the slide wire 23 and movable therealong in the manner hereinafter described. The ends of the slide wire 23 are connected, as by means of the leads 28 to a source of alternating current. Desirably, one of the leads 28 includes a variable resistance 29 and a phase changing circuit 30 which initially are adjusted so that the resistance drop in the slide wire 23 between the end 31 to which one of the leads 22 is connected and the contact 26 is 180 degrees out of phase with the resistance drop in the tubular conductor between the contacts 14 and 15, and so that the voltage drop over the whole slide wire is such as to give the desired voltage sensitivity of the instrument. The sensitivity adjustment is such that all desired measurements are on the instrument scale and yet large enough for accurate reading.

Desirably the coil 12 which induces a circumferential current flow in the tubular conductor 11, and the slide wire resistance 23 are connected to the same source of alternating current 32, for example through separate windings on a common transformer, or by means of separate transformers. By deriving the induced voltage in the tubular conductor and the balancing voltage in the slide wire from the same source, any variation in the voltage of the alternating current source will be ineffective to destroy the balanced relation. If these voltages were derived from different sources, any variation in the voltage of either source might produce an indication of eccentricity in the tubular conductor when actually there was no such eccentricity, or might produce an inaccurate indication of eccentricity.

Where a record is made of variation in the thickness of the tubular conductor, as illustrated in Figure 1, the galvanometer 25 serves as a control instrument for causing operation of the voltage balancing means automatically in response to variation in the circumferential resistance of the tubular conductor between the contacts 14 and 15. If this resistance in the tubular conductor varies as the conductor moves under the contacts, the needle of the galvanometer 25 is moved from its zero position an amount proportional to the change in resistance.

At regular intervals, for example every second, a device not shown in Figure 1 is operated, and if the galvanometer needle has moved from its zero reading, means are automatically set into operation to move the contact 26 along the slide wire resistance 23 a distance proportional to the reading of the galvanometer needle to restore the voltage balance and return the galvanometer needle to zero. The actual mechanism for moving the contact 26 in response to movement of the galvanometer needle is not illustrated in the drawings for the reason that this mechanism itself does not form a part of the present invention, and for the further reason that instruments of this type are known in the art. One such instrument is the Leeds & Northrup Company "Micromax."

From the foregoing description it will be seen that if the circumferential resistance of the tubular conductor varies, this variation causes a voltage unbalance in the external circuit. This voltage unbalance operates automatically to increase or decrease the balancing voltage so as to restore the balance.

Conveniently the permanent record of variation in the circumferential resistance of the tubular conductor 11 may be made by attaching to the movable contact 26 a recording device such as the pen 33. Moving under the pen 33 is a chart 34, upon which movement of the pen 33 and the contact 26 is recorded. If the tubular conductor 11 is eccentric, as may occur in the case of a cable sheath, this eccentricity will be recorded on the chart 34 approximately in the form of a sine wave.

Since the contacts 14 and 15 are in the field set up by the coil 12 it is evident that unless it is possible to establish a symmetrical condition with respect to the effect of the field on the leads 16 and 17, there will be set up potentials in these leads which may be very large in relation to the potentials which we wish to measure. An idea of the magnitude of such extraneous voltages may be gained by considering Figure 1. If the leads 16 and 17 could be carried in from the contacts radially to the center of the conductor and carried from there twisted together, such symmetrical arrangement would be established.

This is manifestly an impracticable arrangement, and it will be seen that if the lead from one contact is carried along the surface of the conductor to a point adjacent the other contact, and the leads be twisted together from that point, the voltage between the two leads at the point of meeting will be different from that in the first arrangement by an amount equal to the voltage which would be induced in a coil of one turn having an area of approximately one fourth the area within the conductor. This relatively large voltage imposed on the much smaller voltage to be measured would result in greatly shifting the galvanometer zero and would require greatly reducing the sensitivity of the instrument in order to keep the reading on the scale.

Figure 2:
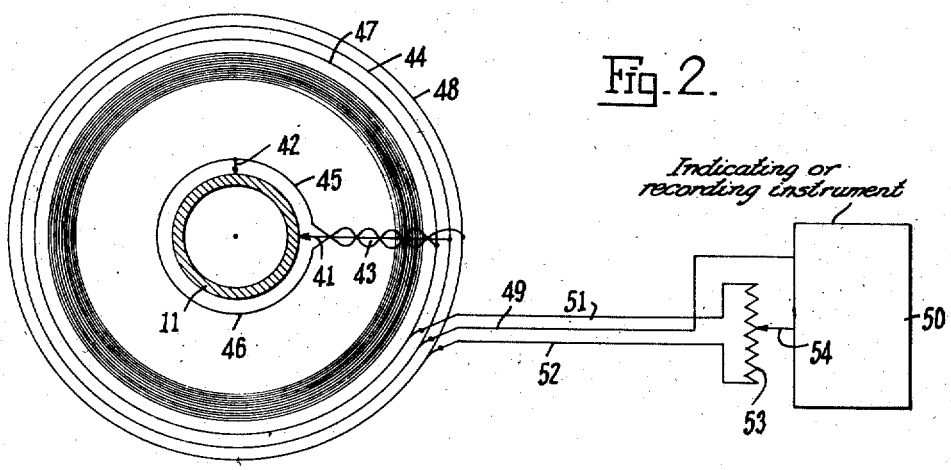
Figure 2 illustrates a modified electrical circuit.
Figure 3:
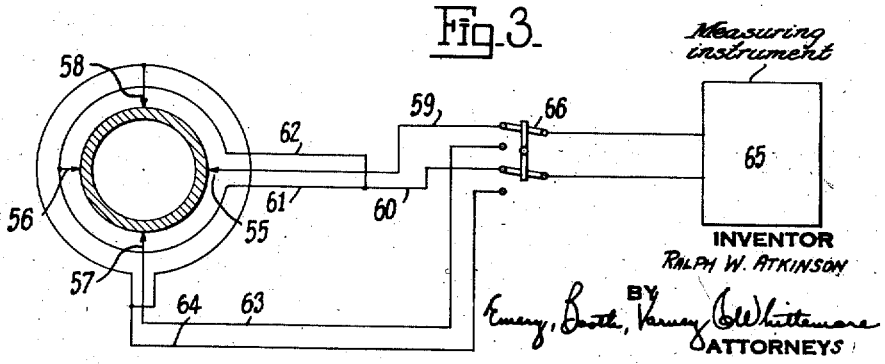
Fig. 3 illustrates a further modification of the electrical circuit.

In Figures 1, 2 and 3, three methods of taking care of this effect are illustrated. In Figure 1, the contacts are 90 degrees apart and the coil 20 is introduced into the circuit and this coil may be adjusted to compensate for the voltage induced in the leads. In Figure 2, the contacts are also 90 degrees apart and the leads are brought out in such a way to provide for adjustment to approximate symmetry by means of a potentiometer connection 53 between two leads from contact 42 which are carried around the conductor in opposite directions. In Figure 3, the contacts are 180 degrees apart and symmetry is obtained by bringing two leads at opposite sides of the cable from one contact to a point adjacent the other of each pair.

Any lack of perfect symmetry or failure to completely compensate for the lack of symmetry will result in some shifting of the galvanometer zero. If a single pair of contacts engage the conductor, and these contacts are not rotated about the conductor, it may be difficult, if not impossible, to determine the correct zero on the galvanometer. However, if the tubular conductor is rotated relatively to the contacts, the zero is obtained very easily as the mean reading of the galvanometer, assuming that the voltages generated in the external circuit remain constant in value and phase relation. A similar result can be obtained by the use of several pairs of non-rotating contacts symmetrically disposed about the tubular conductor.

The sensitivity of the galvanometer 25 may be adjusted to the most desirable condition for different sized conductors or for the conductors of different thicknesses or resistances and the damping maintained constant by simultaneously adjusting resistance 24 in series with the galvanometer and resistance 27 shunted across the leads from contacts 14 and 15.

Conveniently, the resistances 24 and 27 may be adjusted by means of a single control arranged to maintain the correct relative setting.

Means may be provided to adjust the galvanometer field to maximum sensitivity, and as shown in Figure 1 the galvanometer field coil 35 is connected to a source of alternating current by means of the leads 36 which include a suitable variable resistance 37 and phase changing circuit 38.

With the means illustrated in Figure 1, a continuous record is made of the actual amount of variation in thickness of a tubular conductor. If this record is made for a cable sheath as the cable comes from the extruding machine, the operator can know definitely at all times whether or not the cable sheath is eccentric, and if the sheath is eccentric the actual amount of eccentricity. If the variation in sheath thickness exceeds a permissible limit at any time it is a comparatively simple matter for the operator to stop the extruding machine and make the necessary adjustment in the die position, or means might be provided to make this adjustment automatically in response to variation beyond permissible limits.

It has been found that even though the die opening for extruding a metal sheath on an electric cable be accurately adjusted at the beginning of the extruding operation, the sheath may gradually become eccentric as the extruding operation continues. This eccentricity may continue to increase, or in time may correct itself. If the chart 34 moves under the recording pen 33 only while the cable passes through the extruding press, then it is possible by an examination of the chart to locate definitely the longitudinal position on the cable of any eccentric portion shown on the chart.

If the chart 34 moves at a uniform rate of speed without regard to movement of cable through the extruding press, it may be desirable to provide means for making a separate record on the same chart of the operation of the press. For example, means may be connected with the extruding press cylinder or ram, whichever moves, to actuate recording mechanism to show on the chart the movement of the press member. With such records side by side it is possible to locate any eccentricity longitudinally of the cable.

While ordinarily it is not important to record whether the thin portion of an eccentric sheath is on the top, bottom or one side of the cable as the cable emerges from the press, a record of this condition may be made conveniently on the same chart 34. For example, a pen or other recording device might be actuated by an electric contactor adjusted to operate when the rotating contacts 14 and 15 are directly over the cable axis.

Referring to Figure 2, there is illustrated a slightly different electrical circuit from that of Figure 1 for connecting the contacts 41 and 42 to the measuring instrument. In this embodiment a single pair of contacts are spaced, for example at an angle of 90 degrees, around the tubular conductor, and in operation will be rotated about the conductor. The contact 41 is connected by means of a lead 43 to slip ring 44. The contact 42 is connected by means of two leads 45 and 46 to the slip rings 47 and 48 respectively. It will be noted that the leads 45 and 46 extend in opposite directions around the tubular conductor 11 to a point adjacent the contact 41, and that the leads 43, 45 and 46 are twisted together from this point on. Engaging the slip ring 44 is a brush connected by the lead 49 to one terminal of a suitable indicating or recording instrument 50. This instrument 50 might be simply a galvanometer or it might be a graphic millivoltmeter, for example of the type illustrated in Figure 1. Brushes engaging the slip rings 47 and 48 are connected by means of the leads 51 and 52 to opposite ends of the resistance 53. Movable along the resistance 53 is a contact 54 which is connected to the other terminal of the measuring instrument 50.

With the arrangement illustrated in Figure 2, any voltage induced by the coil 12 in the circuit connections other than the resistance drop in the circumferential portion of the tubular conductor between the contacts 41 and 42 may be approximately balanced out in the circuit without the necessity of introducing a compensating coil 20 as in Figure 1.

In the discussion of Figures 1 and 2 it has been indicated that with a concentric tube there is zero voltage between the contacts 14 and 15 or the contacts 41 and 42. While this viewpoint is fundamentally correct, an alternate explanation may be used to define the conditions.

Referring to Figure 1, if the leads 16 and 17 are taken to the measuring instrument, in the absence of coil 20, there will be found a voltage between the terminals of these leads even with concentric tubing. From the standpoint of this alternate explanation, this voltage between the terminals of 16 and 17 may be considered to be the voltage between the contacts 14 and 15, because as a practical matter this is where the voltage between contacts 14 and 15 would be measured.

Carrying through this same thought, the adjustment of the voltage in coil 20 will be such as to neutralize or compensate for the voltage between contacts 14 and 15 on a concentric tube, that is, it is made equal and opposite to that voltage. The difference lies wholly in the expression or viewpoint; the physical performance is the same, namely the adjustment of compensation to give zero voltage at the measuring instrument in the case of a uniform concentric tube. For a non-uniform tube, deflection on the instrument will then be proportional to the departure from uniformity.

This second explanation may now be applied to Figure 2. In this case the function of compensation supplied by coil 20 of Figure 1 is supplied by the single turn coil 45, 46 which surrounds the tubular conductor 11. Here the voltage which would be obtained by the use of leads 45 and 41 alone or 46 and 41 alone is compensated by the use of the complete turn or coil which comprises the leads 45 and 46 and with the aid of the potentiometer 53. With this means the voltage between the terminals 51 and 54 is adjusted to be zero for a uniform tube.

Unless precautions are taken either to mount the slip rings shown in Figures 1 and 2, at a considerable distance from the exciting coil 12, or to shield the rings from the magnetic field surrounding the coil voltages will be induced by the magnetic field directly in the slip rings. Ordinarily, it will be desirable to mount the slip rings adjacent the coil, and it will be difficult, if not impossible, to shield the slip rings electromagnetically. According to this invention the slip rings are made and located relative to the coil as hereinafter described so that voltages induced in the slip rings by the coil are substantially without effect on the operation of the measuring instrument.

Desirably, the slip rings are relatively small in cross section and are made of a conducting material having a relatively high electrical resistance. For example, each slip ring might have a cross section approximately equal to that of a #10 conductor, and a resistance of about fifty times that of copper.

The slip rings desirably are located so that the surface bounded by the loci of the centers of gravity of sections through adjacent rings is substantially parallel to the magnetic flux surrounding the coil. It will be apparent that the relative positions of the slip rings will depend upon their location with respect to the magnetic field surrounding the coil. If the slip rings are mounted adjacent one end of the inducing coil this surface will lie in a plane perpendicular to the longitudinal axis of the coil.

Figure 4:
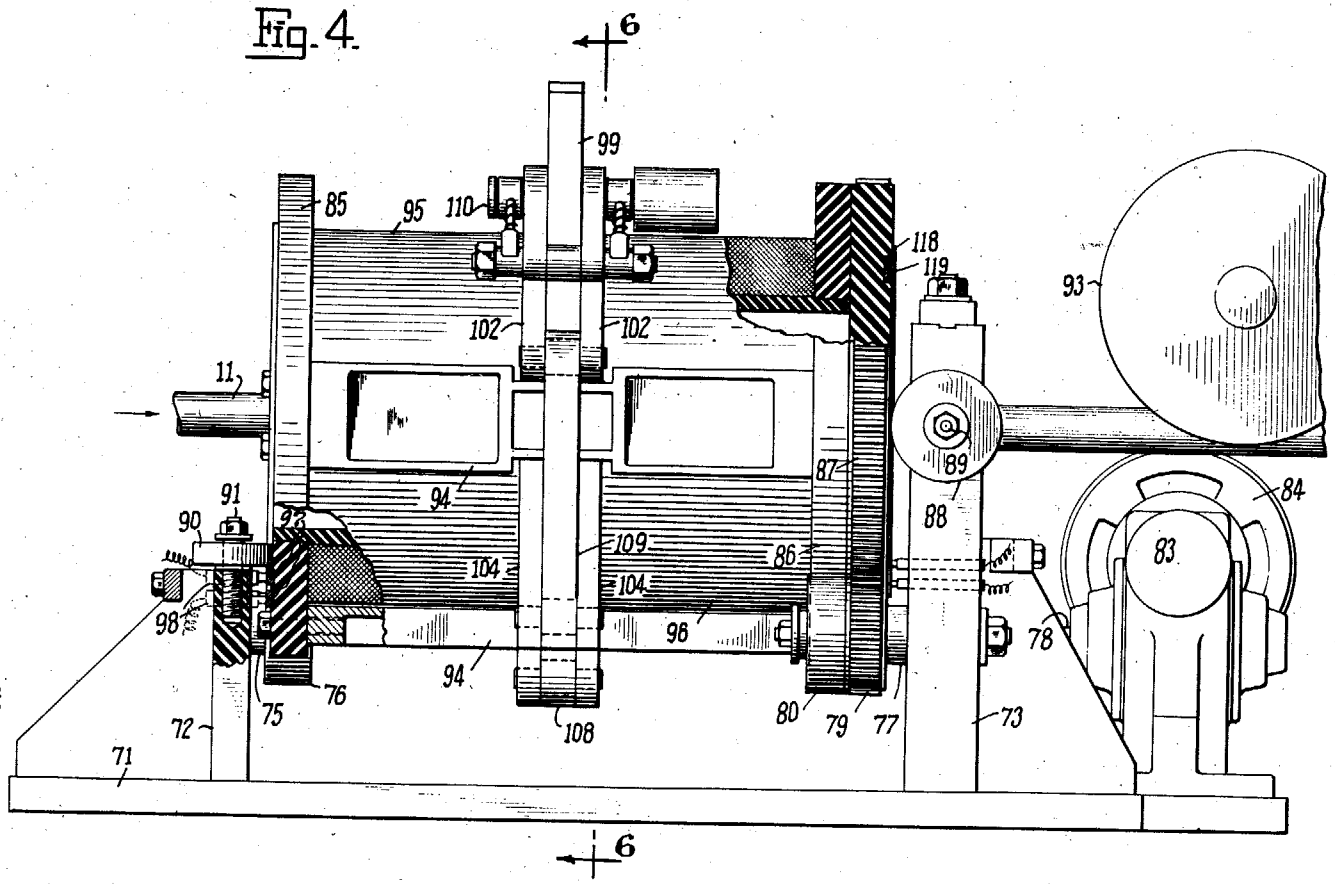
Figure 4 is a side elevation of one suitable apparatus through which the conductor passes in making the measurement.

Alternatively, one of the rings may be so shaped and positioned, as shown in the upper righthand portion of Figure 4, as partly to surround another ring in such a manner that the centers of gravity of sections through the rings are substantially coincident. The arrangements described permit the location of the slip rings adjacent the inducing coil without resorting to magnetic shielding.

The difficulties involved in the use of slip rings and brushes which are required where the contacts are rotated about the conductor, can be eliminated by using a plurality of pairs of contacts arranged so that relative rotation between the tubular conductor and the contacts is unnecessary.

Such an arrangement is illustrated in Figure 3, there being in this embodiment two pairs of contacts 55—56 and 57—58, the contacts of each pair being spaced 180 degrees circumferentially about the tubular conductor 11. Where a plurality of pairs of contacts are employed, the contacts of each pair desirably have the same relation to each other and to the connecting leads.

A lead 59 connects the contact 55 to one terminal of the measuring instrument, and a lead 60 having branches 61 and 62 extending in opposite directions about the tubular conductor 11 to a point adjacent the contact 58 connects the contact 56 to the other terminal of the measuring instrument. Similar leads 63 and 64 connect with the contacts 57 and 58.

With two pairs of contacts as illustrated in Figure 3, two separate measuring instruments might be employed, one instrument connected to each pair of contacts. However, satisfactory results can be obtained by employing a single measuring instrument 65 and a suitable switch 66 for connecting the instrument first to one pair of contacts and then to the other pair of contacts.

More than two pairs of non-rotating contacts may be used to obtain more nearly the results given by rotating contacts. In this case the simple two pole double-throw switch in Figure 3 may conveniently be replaced by a multiple point rotary switch. This arrangement has the very material advantage of eliminating the necessity of slip rings and rotating parts in that part of the device through which the cable passes as it comes from the press.

Figure 5:
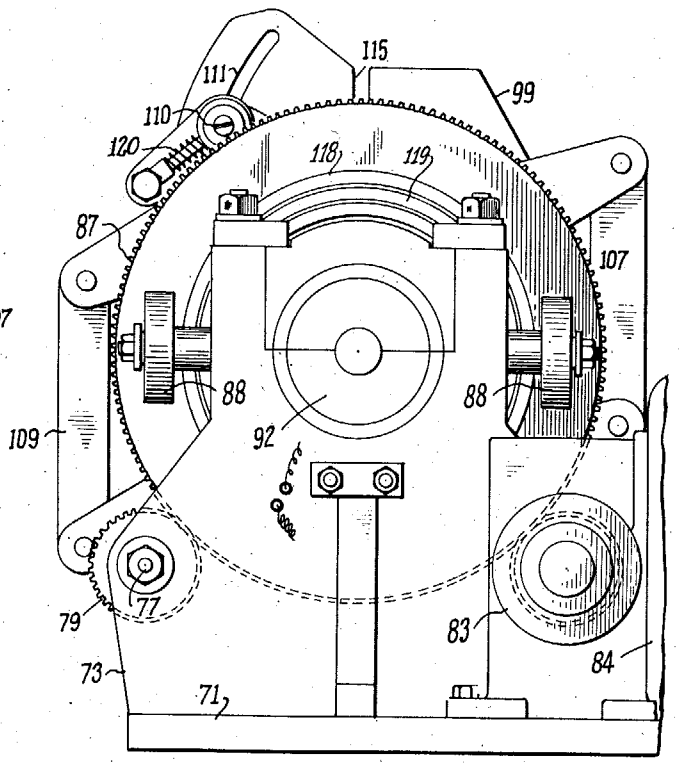
Figure 5 is an elevation looking at the right-hand end of the apparatus shown in Figure 4.
Figure 6:
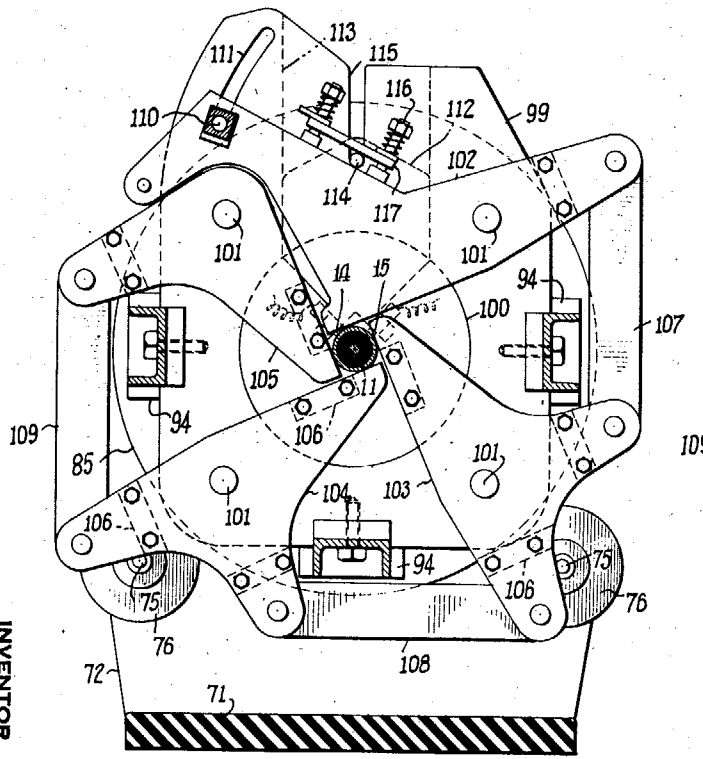
Figure 6 is a vertical section through the apparatus shown in Figure 4, substantially on the line 6—6.

Figures 4, 5 and 6 illustrate one suitable apparatus for inducing circumferential flow of current in a tubular conductor, and means for rotating a pair of contacts about the conductor as the conductor moves longitudinally through the apparatus. A horizontal base 71 has projecting upwardly therefrom adjacent its ends the standards 72 and 73.

Desirably the base member 71 and the standards 72 and 73 are made of insulating material.

Rotatably supported between the standards is a horizontal coil unit for inducing circumferential flow of current in the tubular conductor 11, for example a cable sheath, as the cable passes through the coil. Desirably the coil unit is axially aligned with the sheathed cable as the cable emerges from the lead press, not shown. In Figure 4, the cable or other tubular conductor 11 moves from left to right.

Mounted in the standard 72 adjacent its upper corners and extending inwardly are the spindles 75, upon each of which is rotatably mounted a bearing 76.

Mounted in the standard 73 and aligned with the spindles 75 are the inwardly extending spindles 77 and 78. Rotatably mounted on the spindle 77 is a gear 79 and a bearing 80. Mounted on the spindle 78 is a similar gear and a similar bearing. The gear on the spindle 78 is rigidly secured to the spindle, and the spindle is connected, for example, through a worm gear speed reducer 83 with an electric motor 84. Desirably the bearings and gears mounted on the spindles 75, 77 and 78 are made of insulating material.

The coil unit is supported with its cylindrical end rings 85 and 86 resting on the bearings on the spindles 75, 77 and 78, whereby the coil unit may be readily rotated about its longitudinal axis. Secured on the end ring 86 is a gear 87 which engages the gears mounted on the spindles 77 and 78, whereby the coil unit may be rotated through the driving connection with the motor 84. Desirably the end rings 85 and 86 and the gear 87 are made of insulating material.

Movement of the coil unit longitudinally between the standards 72 and 73 is prevented, for example, by means of the bearings 88 rotatably mounted on spindles 89 secured in the standards 73, and the bearing 90 rotatably mounted on the spindle 91 secured in the upper end of the standard 72. In prior art devices it was customary and considered essential to rotate the contacts once for every inch of length of the cable sheath; in one satisfactory operating embodiment of the present invention the contacts made one rotation for every ten feet of length of the cable sheath. This is about 1% of the rotational speed formerly required.

The upper end of the standard 73 desirably is provided with a guide 92 which aids in centering the conductor in the coil unit as the conductor moves longitudinally through the coil. Conveniently the guide 92 is easily removable from the standard 73 so that it may be replaced with other guides for different sized conductors. As shown in Figure 4, additional guiding means such as the sheave 93 may be employed for directing the path of the conductor after it leaves the guide 92.

The end rings 85 and 86 of the coil unit are rigidly secured to each other in spaced relation, as by means of three metal struts 94, which form with the end rings a cage. In the illustrative embodiment, the coil for inducing circumferential current flow in the tubular conductor is divided into two sections 95 and 96. Each section of the coil is wound on a cylindrical tube, one end of which projects beyond the end of the coil winding and is secured in the central opening through the adjacent end ring. The two sections of the coil may be connected electrically in series or in parallel, and the coil terminals are connected to the slip rings 97 mounted, for example, on the outer face of the end ring 85. Current is supplied to the coil through the slip rings 97 and brushes 98 mounted in the standard 72.

As may be seen more clearly in Figure 6, intermediate the coil sections 95 and 96 is a plate 99, secured along its edge to the struts 94. Desirably this plate 99 is made of insulating material. The plate has a central opening 100 of substantially the same diameter as the inside diameter of the cylindrical tubes upon which the coil is wound.

The plate 99 serves as a mounting for the contacts engaging the tubular conductor, and conveniently serves also as a support for means for centering the conductor axially within the coil unit.

Mounted in the plate 99, and extending from both faces thereof, are four pivot pins 101. Pivotally mounted on these pins 101, are the rockers 102, 103, 104 and 105. Similar rockers are mounted on both faces of the plate 99, and corresponding rockers on opposite sides of the plate are rigidly secured to turn together as by means of spacing blocks 106 secured to the rockers with screws.

The outer ends of the rockers are connected by means of links 107, 108 and 109 so that the rockers all turn about their several pivots together. The inner ends of the rockers define an opening through which the tubular conductor 11 passes, and the size of this opening may be adjusted readily for different sized conductors. Conveniently, this adjustment is controlled by means of a screw 110 which may pass through openings in the rockers 102 and through an arcuate slot 111 in the upper end of the plate 99. Desirably, means are provided such as the spring 120 tending to turn the rockers so as to maintain the inner ends of the rockers in guiding engagement with the conductor.

Conveniently the contacts 14 and 15 which engage the tubular conductor are mounted in the forked ends of a flat member of insulating material 112, which in turn may slide in a radial slot 113 in the plate 99. Conveniently, means are provided to move the contact carrying member 112 in the slot 113 automatically as the conductor guiding rockers turn about their pivots.

In Figure 6, the outer end of the member 112 has secured therein a pin 114 projecting from both faces of the member through a slot 115 in a plate 99 and engaging the upper surfaces of the rockers 102. Secured in the upper edge of the rocker 102 are screws 116 carrying a spring pressed plate 117 which serves to keep the pin 114 in engagement with the upper edge of the rocker 102. It will be apparent that as the rocker 102 is turned about its pivot 101, the contact bearing member 112 will be moved radially toward and away from the conductor 11. The compensating coil 20 which is shown in Figure 1 is not shown in Figure 6, but conveniently this coil, comprising only a turn or two of wire, would be mounted within the member 112.

The slip rings by which connections are made to the contacts 14 and 15 desirably are located on the outer face of the gear 87, as shown in Figures 4 and 5. In the illustrative embodiment there are two of these slip rings 118 and 119, and desirably they are mounted directly over the end of the coil winding, as shown in Figure 4.

The slip ring 118 is shaped so as to partly surround the slip ring 119 in such a manner that the centers of gravity of sections through the rings are substantially coincident. The advantages of this arrangement have been set forth in the preceding description. The slip ring 118 is generally a shallow U-shape. Connection from the contact engaging the tubular conductor to the slip ring 119 conveniently will be made through an opening in the bottom of the U-shape. Substantially the same result may be accomplished if the slip ring 118 is made in the form of two separate rings, one on either side of the ring 119, having jumper connections at intervals circumferentially of the rings.

Conveniently, the brushes engaging the rings 118 and 119 are mounted in the standard 73. Desirably these brushes are small in cross section, are located near together, and are mounted on the same radius of the coil all to reduce the voltage induced by the coil.

Applicant has provided an improved method and an improved apparatus for measuring accurately variation in the thickness of a tubular conductor, and for making a record of any variation in thickness.

It will be understood that the present invention may be variously modified and embodied within the scope of the subjoined claims.

I claim:

1. Apparatus for measuring variation in the thickness of a tubular conductor comprising, in combination, means for causing an electric current to flow circumferentially in the conductor, two contacts for engaging the conductor at points spaced circumferentially about the conductor, an external circuit including means for balancing the voltage between the spaced contacts on the conductor surface with a voltage 180 degrees out of phase, means for causing relative movement between the conductor and the spaced contacts, and means operating automatically in response to any voltage unbalance in the external circuit caused by variation in the resistance of the conductor between the contacts as the contacts move over the conductor surface to adjust the voltage balancing means and restore the voltage balance in the external circuit.

2. Apparatus for measuring variation in the thickness of a tubular conductor comprising, in combination, means for causing an electric current to flow circumferentially in the conductor, two contacts for engaging the conductor at points spaced circumferentially about the conductor, an external circuit including means for balancing the voltage between the spaced contacts on the conductor surface with a voltage 180 degrees out of phase, means for causing relative movement between the conductor and the spaced contacts, means operating automatically in response to any voltage unbalance in the external circuit caused by variation in the resistance of the conductor between the contacts as the contacts move over the conductor surface to adjust the voltage balancing means and restore the voltage balance in the external circuit, and means for recording continuously any variation in the conductor thickness as evidenced by the adjustment of the voltage balancing means.

3. Apparatus for measuring variation in the thickness of a tubular conductor comprising, in combination, means for causing an electric current to flow circumferentially in the conductor, contacts for engaging the conductor at points spaced circumferentially about the conductor, an external circuit for balancing the voltage between the spaced contacts on the conductor surface with a voltage 180 degrees out of phase, means for causing relative movement between the conductor and the spaced contacts, and means for measuring continuously any voltage unbalance in the external circuit caused by variation in the resistance of the conductor between the contacts as the contacts move over the conductor surface.

4. Apparatus according to the preceding claim wherein the current flowing in the tubular conductor and the balancing voltage in the external circuit are derived from the same source, whereby variations in the voltage of the source are ineffectual to destroy the voltage balance in the external circuit.

5. An eccentricity detector for tubular conductors comprising, in combination, means for inducing an electric current flow circumferentially in the conductor, two contacts for engaging the conductor at circumferentially spaced points, means for causing relative movement of the contacts longitudinally of the conductor, means for causing relatively slow relative rotation between the conductor and the contacts, a graphic millivoltmeter, and means connecting the contacts and the millivoltmeter to make a continuous record of the amount of variation in the resistance of the conductor between the contacts as the contacts move over the conductor surface, said last mentioned means including means compensating for voltages other than the resistance drop in the conductor between the contacts.

6. Apparatus for measuring variation in the thickness of a tubular conductor comprising, in combination, a coil through which the conductor passes for inducing an electric current flow circumferentially in the conductor, contacts for engaging the conductor at circumferentially spaced points substantially midway of the coil ends, means for rotating the contacts about the conductor, a graphic millivoltmeter, and means connecting the contacts and the millivoltmeter, said last mentioned means including means for neutralizing any voltage induced directly therein by the coil.

7. Apparatus for measuring variation in the thickness of a tubular conductor comprising, in combination, a coil through which the conductor passes for inducing an electric current flow circumferentially in the conductor, contacts for engaging the conductor at circumferentially spaced points, means for causing relative movement longitudinally of the conductor between the conductor on the one hand and the coil and the contacts on the other hand, and means for causing much slower relative movement, circumferentially of the conductor between the conductor on the one hand and the coil and the contacts on the other hand, means connected to said contacts for measuring continuously the amount of variation in the circumferential resistance of the conductor between the contacts, and means for compensating for voltages other than the resistance drop in the conductor between the contacts.

8. Apparatus for measuring variation in the thickness of a tubular conductor comprising, in combination, a coil for inducing flow of electric current circumferentially in the conductor, contacts engaging the conductor and connected with an external circuit for measuring the voltage circumferentially of the conductor, and means included in the connections between the contacts and the external circuit compensating for voltage other than the resistance drop in the sheath.

9. Apparatus for measuring variation in the thickness of a tubular conductor comprising, in combination, means for establishing an electric current flow circumferentially in the conductor, a pair of contacts for engaging the conductor at circumferentially spaced points, means for causing relative longitudinal movement and much slower relative circumferential movement between the conductor and the contacts, a millivoltmeter, and electrical connections between the contacts and the millivoltmeter, and means in addition to said connections for maintaining substantial electrical symmetry in said connections to compensate for voltage other than the resistance drop in the sheath.

10. Apparatus for measuring variation in the thickness of a tubular conductor comprising, in combination, means for establishing an electric current flow circumferentially in the conductor, a pair of contacts for engaging the conductor at circumferentially spaced points, means for causing relative movement between the conductor and the contacts, a millivoltmeter, and electrical connections between the contacts and the millivoltmeter, the connection from one of the contacts including a compensating coil to make this connection substantially electrically symmetrical with the connection from the other contact.

11. Apparatus for measuring variation in the thickness of a tubular conductor comprising, in combination, a coil through which the conductor passes for inducing an electric current flow circumferentially in the conductor, contacts for engaging the conductor at circumferentially spaced points, means for rotating the contacts about the conductor, a graphic millivoltmeter, and means connecting the contacts and millivoltmeter, including a plurality of slip rings and brushes, said slip rings being so located that the surface bounded by the loci of the centers of gravity of sections through adjacent rings is substantially parallel to the magnetic flux around the coil.

12. Apparatus for measuring variation in the thickness of a tubular conductor comprising, in combination, a coil through which the conductor passes for inducing an electric current flow circumferentially in the conductor, contacts for engaging the conductor at circumferentially spaced points, means for rotating the contacts about the conductor, a graphic millivoltmeter, and means connecting the contacts and the millivoltmeter including a plurality of slip rings and brushes, said slip rings being positioned adjacent one end of the coil with the loci of the centers of gravity of sections through the rings in a common plane perpendicular to the longitudinal axis of the coil.

13. Apparatus for measuring variation in the thickness of a tubular conductor comprising, in combination, a coil through which the conductor passes for inducing an electric current flow circumferentially in the conductor, contacts for engaging the conductor at circumferentially spaced points, means for rotating the contacts about the conductor, a graphic millivoltmeter, and means connecting the contacts of the millivoltmeter, including a plurality of slip rings and brushes, said slip rings being made of a high resistance conducting material and being positioned in the magnetic field surrounding the coil.

14. Apparatus for measuring variation in the thickness of a tubular conductor comprising, in combination, a coil through which the conductor passes for inducing an electric current flow circumferentially in the conductor, contacts for engaging the conductor at circumferentially spaced points, means for rotating the contacts about the conductor, a graphic millivoltmeter, means connecting the contacts and the millivoltmeter including a plurality of slip rings and brushes, said slip rings being positioned in the magnetic field surrounding the coil, one of said rings being so shaped and positioned as partly to surround another ring in such a manner that the centers of gravity of sections through the rings are substantially coincident.

15. Apparatus for measuring variation in the thickness of a tubular conductor comprising, in combination, means for establishing an electric current flow circumferentially in the conductor, a plurality of pairs of contacts for engaging the conductor at circumferentially spaced points, the contacts of each pair having the same relation to each other and to the connecting leads as the contacts of every other pair, means for causing relative longitudinal movement between the conductor and the contacts, and means connected to said contacts for measuring circumferential variation in the resistance of the conductor along its length.

16. Apparatus for measuring variation in the thickness of a tubular conductor comprising, in combination, means for establishing an electric current flow circumferentially in the conductor, a pair of contacts for engaging the conductor at points spaced 180 degrees circumferentially of the conductor, means for causing relative movement between the conductor and the contacts, and means connected to said contacts for measuring circumferential variation in the resistance of the conductor along its length.

17. Apparatus for measuring variation in the thickness of a tubular conductor comprising, in combination, means for establishing an electric current flow circumferentially in the conductor, a pair of contacts for engaging the conductor at points spaced 180 degrees circumferentially of the conductor, means for causing relative movement between the conductor and the contacts, a millivoltmeter, and connections between the contacts and the millivoltmeter which balance the potential impressed on the millivoltmeter substantially to zero when the circumferential resistance of the conductor is uniform.

18. Apparatus for measuring variation in the thickness of a tubular conductor comprising, in combination, means for establishing an electric current flow circumferentially in the conductor, a pair of contacts for engaging the conductor at points spaced circumferentially of the conductor, means for causing relative movement between the conductor and the contacts, a millivoltmeter, a lead from one of the contacts extending outwardly from the conductor substantially in a radial direction, two leads from the other contact extending around the conductor in opposite directions to a point adjacent the first contact and then outwardly from the conductor with the first lead, said leads connecting with the millivoltmeter.

19. The method of determining variation in the thickness of a tubular conductor which comprises causing a current to flow circumferentially in the conductor, balancing the voltage between two circumferentially spaced points on the conductor with a voltage 180 degrees out of phase, and continuously measuring any unbalance between the last mentioned voltage and the voltage between similarly spaced points elsewhere on the conductor.

20. The method of determining variation in the thickness of a tubular conductor which comprises causing a current to flow circumferentially in the conductor, balancing the voltage between two circumferentially spaced points on the conductor with a voltage 180 degrees out of phase, and automatically restoring this voltage balance in response to any unbalance resulting from variation in the conductor resistance as the spaced points are moved over the conductor surface.

21. The method of determining variation in the thickness of a tubular conductor which comprises causing a current to flow circumferentially in the conductor, balancing the voltage between two circumferentially spaced points on the conductor with a voltage 180 degrees out of phase, automatically restoring this voltage balance in response to any unbalance resulting from variation in the conductor resistance as the spaced points are moved over the conductor surface, and continuously recording any variation in the conductor thickness as evidenced by variation in the balancing voltage.

22. Apparatus for measuring variation in the thickness of a tubular conductor comprising, in combination, means for establishing an electric current flow circumferentially in the conductor, a plurality of pairs of contacts mounted for slight movement relative to said first named means, for engaging the conductor at diametrically opposed circumferentially spaced points, means for causing relative longitudinal movement between the conductor and the contacts, and means consecutively connected to said pairs of contacts for measuring circumferential variation in the resistance of the conductor along its length.

23. Apparatus for measuring variation in the thickness of a tubular conductor comprising, in combination, means for establishing an electric current flow circumferentially in the conductor, a plurality of pairs of contacts for engaging the conductor at circumferentially spaced points, the contacts of each pair having the same relation to each other and to the connecting leads as the contacts of every other pair, means for causing relative longitudinal movement between the conductor and the contacts, and means consecutively connected to said pairs of contacts for measuring circumferential variation in the resistance of the conductor along its length.

24. The method of measuring eccentricity in a tubular conductor which comprises causing a current to flow circumferentially in the conductor, and continuously recording variation in the voltage between a plurality of pairs of circumferentially spaced contact points at a definite angular separation on the conductor surface while maintaining the same relation between the contacts of each pair to each other and to their connecting leads as to the contacts of every other pair and causing the conductor to move solely in a longitudinal direction relative to said contacts.

25. An eccentricity indicator for tubing composed of electrically conducting material, said indicator comprising in combination an exciting coil adapted to surround tubing to be tested, a compensating coil adapted to surround the tubing, a pair of contacts adapted to touch points on a circumference of the tubing, said compensating coil being arranged to constitute part of the connecting lead from one of said contacts, and current responsive apparatus operatively connected in series relation with said contacts and said compensating coil, the connections being such that voltage induced in said compensating coil acts in opposition to voltage induced circumferentially in the tubing.

26. An eccentricity indicator for tubing composed of electrically conducting material, said indicator comprising in combination, an exciting coil adapted to surround the tubing to be tested, a pair of contacts adapted to touch points on the circumference of the tubing, a compensating coil disposed in the field of the exciting coil adapted to adjust the voltage measured between contacts, and current responsive apparatus operatively connected in series relation with said contacts and said compensating coil.

27. An eccentricity indicator for tubing composed of electrically conducting material, said indicator comprising in combination an exciting coil adapted to surround tubing to be tested, a compensating coil adapted to surround the tubing, a pair of contacts adapted to touch points on a circumference of the tubing, and current responsive apparatus operatively connected in series relation with said contacts and said compensating coil, the connections being such that voltage induced in said compensating coil acts in opposition to voltage induced circumferentially in the tubing.

28. An eccentricity indicator for tubing composed of electrically conducting material, said indicator comprising in combination an exciting coil adapted to be connected to a source of alternating current and adapted to surround tubing to be tested, a compensating coil also adapted to surround the tubing, a pair of contacts adapted to touch points on a circumference of the tubing, said compensating coil being arranged to constitute part of the connecting lead from one of said contacts, and directionally responsive alternating current-responsive apparatus operatively connected in series relation with said contacts and said compensating coil, the connections being such that voltage induced in said compensating coil acts in opposition to voltage induced circumferentially in the tubing, and the electrical dimensions being such that the opposing voltages are balanced in case the contacts are against a portion of the tubing of average thickness.

29. An eccentricity indicator for tubing composed of electrically conducting material, said indicator comprising in combination, an exciting coil adapted to be connected to a source of alternating current and adapted to surround tubing to be tested, a pair of contacts adapted to touch points on the circumference of the tubing, a compensating coil disposed in the field of the exciting coil adapted to adjust the voltage measured between contacts, and directionally responsive alternating current-responsive apparatus operatively connected in series relation with said contacts and said compensating coil, the electrical dimensions being such that the opposing voltages are balanced in case the contacts are against a portion of the tubing of average thickness.

30. An eccentricity indicator for tubing composed of electrically conducting material, said indicator comprising in combination an exciting coil adapted to be connected to a source of alternating current and adapted to surround tubing to be tested, a compensating coil also adapted to surround the tubing, a pair of contacts adapted to touch points on a circumference of the tubing, and directionally responsive alternating current-responsive apparatus operatively connected in series relation with said contacts and said compensating coil, the connections being such that voltage induced in said compensating coil acts in opposition to voltage induced circumferentially in the tubing, and the electrical dimensions being such that the opposing voltages are balanced in case the contacts are against a portion of the tubing of average thickness.

31. An eccentricity indicator for tubing composed of electrically conducting material, said indicator comprising in combination, an exciting coil adapted to surround tubing to be tested, a plurality of pairs of contacts adapted to touch points on the circumference of the tubing, a compensating coil for each pair of contacts adapted to adjust the voltage measured between contacts, said compensating coil being adapted to surround the tubing and to constitute part of the connecting lead from one of the contacts of a pair, current responsive apparatus, and means for operatively connecting said current responsive apparatus in series relation with said compensating coils and different ones of said pairs of contacts successively.

32. An eccentricity indicator for tubing composed of electrically conducting material, said indicator comprising in combination, an exciting coil adapted to surround tubing to be tested, a plurality of pairs of contacts adapted to touch points on the circumference of the tubing, a compensating coil disposed in the field of the exciting coil adapted to adjust the voltage measured between contacts, current responsive apparatus, and means for operatively connecting said current-responsive apparatus in series relation with different ones of said pairs of contacts successively.

33. An eccentricity indicator for tubing composed of electrically conducting material, said indicator comprising in combination an exciting coil adapted to surround tubing to be tested, a compensating coil also adapted to surround the tubing, a plurality of pairs of contacts adapted to touch points on the circumference of the tubing, current-responsive apparatus, and means for operatively connecting said current-responsive apparatus in series relation with said compensating coil and different ones of said pairs of contacts successively, the connections being such that voltage induced in said compensating coil opposes that induced circumferentially in the tubing.

34. The method of measuring the eccentricity in a tubular conductor which comprises causing a circumferential flow of current in the conductor from a surrounding exciting coil, and making electrical connection to said sheath by a pair of circumferentially spaced contacts, connecting these contacts to a voltage measuring device, and compensating for the voltage due to the loop connection between the contacts for average conductor thickness or concentricity by placing a compensating coil in series with one of said contacts and in the field of said exciting coil.

35. The method of measuring the eccentricity in a tubular conductor which comprises causing a circumferential flow of current in the conductor from a surrounding exciting coil, and making electrical connection to said sheath by a pair of circumferentially spaced contacts, connecting these contacts to a voltage measuring device, and compensating for the voltage due to the loop connection between the contacts for average conductor thickness or concentricity by placing a compensating coil in series with one of said contacts and in the field of said exciting coil, said compensating coil surrounding said conductor.

36. The method of measuring the eccentricity in a tubular conductor which comprises causing a circumferential flow of current in the conductor from a surrounding exciting coil, and making electrical connection to said sheath by a pair of circumferentially spaced contacts, connecting these contacts to a voltage measuring device, and compensating for the voltage due to the loop connection between the contacts for average conductor thickness or concentricity by placing a compensating coil in series with one of said contacts and in the field of said exciting coil, said compensating coil surrounding said conductor and being connected to said contact intermediate its ends.

RALPH W. ATKINSON.